Feb. 10, 1970　　　C. M. LUCAS　　　3,495,115
CURRENT COLLECTOR ASSEMBLY WITH FOIL ANCHORED ON BASE
Filed Jan. 5, 1967
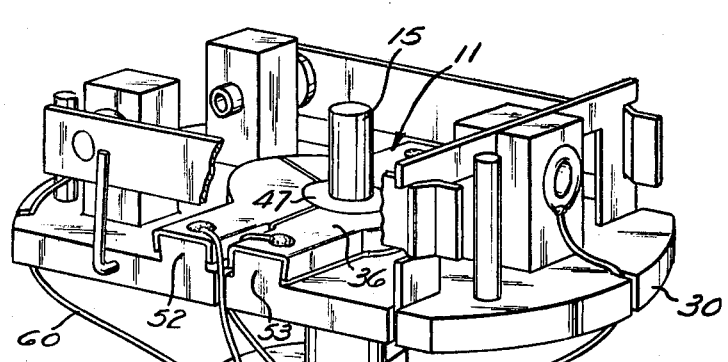
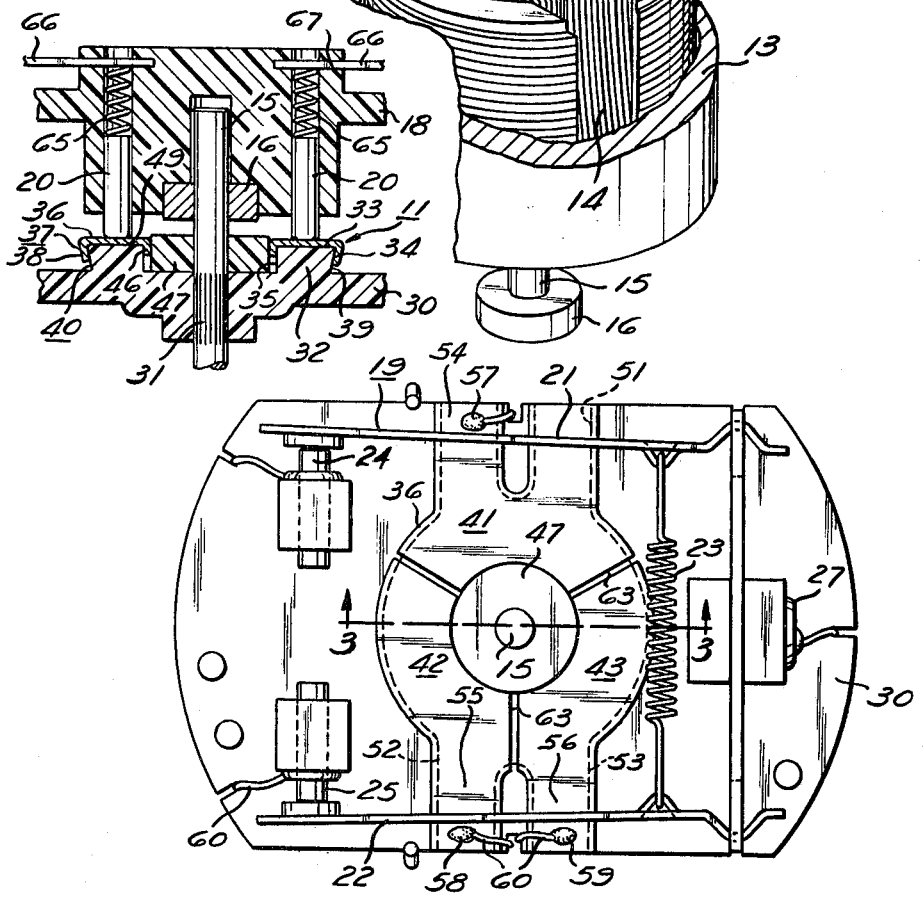
INVENTOR.
CLYDE M. LUCAS
BY Woodling, Krost,
Granger and Rust
ATTORNEYS United States Patent Office 3,495,115
Patented Feb. 10, 1970

3,495,115
CURRENT COLLECTOR ASSEMBLY WITH FOIL ANCHORED ON BASE
Clyde M. Lucas, Alliance, Ohio, assignor to Consolidated Electronic Industries Corporation, a corporation of Delaware
Filed Jan. 5, 1967, Ser. No. 607,471
Int. Cl. F16c 9/00
U.S. Cl. 310—237                     13 Claims

ABSTRACT OF THE DISCLOSURE

A commutator for a small electric motor made from metal foil placed on an outer insulated face of a base on the rotor of the motor. Shoulder portions are generally perpendicular to the outer face and the metal foil is wrapped around such shoulder portions as anchor means to anchor the foil to the base. Preferably, the anchor means also includes the fact that the shoulder portions are undercut and a washer with an insulated surface is forced into engagement with some of the shoulder portions.

BACKGROUND OF THE INVENTION

Field of the invention

The invention relates to current collector assemblies such as slip rings and commutators in dynamoelectric machines and more particularly to sub-fractional horsepower machines.

Description of the prior art

The current collector mechanism of the present invention may be utilized in commutators, for example, in small electric motors in practical applications similar to those shown in U.S. Patent Nos. 2,883,598, Re. 24,780; 2,936,412; 3,268,682 and 2,848,676.

SUMMARY OF THE INVENTION

The invention may be incorporated in a dynamoelectric machine having a rotor and having brushes acting on a current collector assembly, the improvement in said current collector assembly comprising, a base attached to and rotating with said rotor and having an axis substantially coaxial with the rotor, an outer face on said base, shoulder means on said base adjacent said outer face and having first and second portions each disposed substantially perpendicular relative to said outer face, the surfaces of said outer face and said shoulder portions being insulated, a thin metal foil current collector on said insulated outer face, and anchor means anchoring said foil on said base including portions of the foil at generally opposing places being bent around at least part of said shoulder portions.

Accordingly, an object of the invention is to provide a current collector assembly for a dynamoelectric machine which may be easily and economically constructed and assembled.

Another object of the invention is to provide a current collector assembly which has a smooth path for cooperation with brushes.

Other objects and a fuller understanding of the invention may be had by referring to the following description and claims, taken in conjunction with the accompanying drawings.

DESCRIPTION OF THE DRAWINGS

FIGURE 1 is a perspective view of an electric motor with each cap removed and incorporating the current collector assembly of the invention;
FIGURE 2 is a plan view of the assembly; and
FIGURE 3 is a sectional view on line 3—3 of FIGURE 2.

DETAILED DESCRIPTION

The figures of the drawing illustrate a current collector assembly 11. As one example, this current collector assembly is shown as a commutator on a dynamoelectric machine having a rotor 12 and a stator 13. This may be a small sub-fractional horsepower electric motor, for example. This current collector assembly is shown in FIGURES 1, 2 and 3 to an enlarged scale, for example, because one use with sub-fractional horsepower motors may be with motors smaller than that shown in the drawings. The stator 13 has winding means 14 on one of the stator and rotor, and in this case is illustrated as being on the rotor 12. The rotor is shown as having three polar segments for cooperation with the two-pole stator 13, and accordingly the winding means is segmented into three segments each with two coil ends. The rotor 12 is fixed on a shaft 15 which may be journalled in bearings 16 fixed relative to the stator 13.

The upper bearing 16 is carried in an end cap 18, shown in FIGURE 3, which may be of insulation material and is fixed in a housing, not shown, relative to the stator 13. The current collector assembly 11 is illustrated in this preferred embodiment as a commutator. This commutator 11 cooperates with a governor mechanism 19 and brushes 20 to control the flow of electric energy to the winding means 14. The governor mechanism is more particularly shown and described in a copending application assigned to the same assignee and filed on Jan. 4, 1967, Ser. No. 607,211 by Andrew F. Deming. This governor mechanism includes generally contact arms 21 and 22 acted on by a spring 23 and carrying movable contacts for cooperation with fixed contacts 24 and 25. Terminal 27 connects to the contact arms 21 and 22 as another terminal of the governor mechanism 19.

The commutator 11 is mounted on a base 30 which may have an insulated surface and preferably is made entirely from an insulated material. In the preferred embodiment, this base 30 is made from a molded hardened plastic material. The base 30 provides a support for the governor mechanism 19 as well as for the commutator 11, and accordingly, the base 30 is a generally flat plate substantially perpendicular to the shaft 15. A knurled portion 31 on the shaft 15 receives the base 30 so that it is in a plane perpendicular to the shaft 15 and rotates with it. A raised annular ring 32 is provided as a unitary part of the base 30. This ring 32 has an outer face 33 and an outer periphery 34 and an inner periphery 35. Metal foil 36 is disposed on the outer face and held thereto by anchor means 37. The metal foil 36 provides the conductive metal portion of the commutator 11. The anchor means 37 includes portions 38 of the metal foil 36 which are bent around shoulder portions 39 which are portions of shoulder means 40 adjointing the outer face 33. In the preferred embodiment, these bent portions 38 of the metal foil are at generally opposing portions of the commutator 11.

Because the winding means 14 has three segments, each with two conductor ends, the commutator 11 in this case has three segments 41, 42 and 43, as best shown in FIGURE 2. In this preferred embodiment, each of the commutator segments 41–43 has bent portions 38 of the foil 36 on generally opposing portions thereof to anchor the foil to the base 30. Bent portions 46 of the metal foil 36 engage the inner periphery 35 of the ring 32. This inner periphery 35 defines an annular recess coaxial with the shaft 15. A washer 47 with an insulating surface or preferably of insulated material, is placed into position surrounding the shaft 15 and wedging the bent portions 46 between the outer periphery of the washer 47 and the inner periphery 35 of the ring 32. This also forms a part of the anchor means 37. Another part of the anchor means may be an adhesive 49 disposed between the outer face 33 and the metal foil 36 and in such case the washer 47 may be eliminated. Adhesive backed metal foil has been used with success.

As shown in FIGURE 2, the ring 32 has shoulder extensions 51, 52 and 53 with the outer surfaces thereof in the same plane as the outer surface 33. Terminal extensions 54, 55 and 56 of the metal foil 36 overlie the shoulder extensions 51, 52 and 53, respectively. The shoulder means 40 extend as a part of these shoulder extensions 51–53 and the metal foil 36 has bent portions 38 and 46 bent around such shoulder means 40 on the shoulder extensions 51–53. Such bent portions also constitute a part of the anchor means 37 to secure the metal foil 36 to the base 30. Terminal connections 57, 58 and 59 are on the terminal extensions 54, 55 and 56, respectively, to secure the respective conductor end 60 of the winding means 14 to these terminal extensions 54–56. Such terminal connections 57–59 and the conductor ends 60 also form a part of the anchor means 37.

The raised ring 32 has generally radial cuts 63 therein cutting into the outer face 33 to segment this ring 32. The metal foil 36 may initially be placed on the ring 32 in a single piece, then knife blade tools may be used to press downwardly at the radial cuts 63 to sever the metal foil at these places and partially force the metal foil into such radial cuts 63. This segments the metal foil 36 into the three commutator segments 41, 42 and 43. The terminal connections 57–59 may be solder connections or other conventional means of making a metal-to-metal connection. The shoulder means 40 and especially the outer periphery 34 is an undercut shoulder meaning that the metal foil 36 at the bent portions 38 must be bent more than 90 degrees from the plane of the outer face 33 in order to engage these generally opposing shoulder portions 39. Such undercut shoulder portions means that the metal foil 36 is clinched onto the ring 32 which is part of the base 30. Thus this aids the anchoring of the metal foil 36.

The brushes 20 are carried in the end cap 18 and urged against the commutator 11 by springs 65. Terminal blades 66 may extend into slots 67 in the end cap 18 to retain the spring 65 in place to thus assure resilient engagement of the brushes 20 with the commutator 11.

The metal foil 36 may be clinched to the base 30 by using a rubber pad female die to press the foil against the outer face 33. The rubber pad will deform to wrap itself around the outer shoulder portions 39 and thus grip the foil to these shoulder portions. Alternatively, a metal die may be used with one or more parts to actually bend the foil into engagement with the shoulder means 40.

The outer face 33 may be made planar within a close tolerance by plastic molding techniques and accordingly the contact surface of the commutator 11 against which the brushes 20 engage will be planar within very close limits. This eliminates jumping of the brushes and consequent arcing and results in excellent commutation.

The insulator washer 47 in an insulator member which engages the bent portions 38 or 46 of the metal foil 36 and binds it against portions of the shoulder means 40. In the preferred embodiment, this washer 47 compresses the metal foil against the inner periphery 35 of the ring 32. The bent portions 38 and 46 are each bent approximately 90 degrees relative to the foil 36 on the outer face 33 and because of the undercut outer shoulder 34, the foil is actually bent 90 degrees or more at two shoulders for a total bend of more than 180 degrees to be clinched onto the base 30.

The metal foil 35 as actually used in one practical embodiment of the invention was a copper foil 0.004 inch thick. This has been found to give in excess of 1,000 hours of use which exceeds requirements for phonograph motor use, for example. Aluminum foil or other conductive foils may also be used.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts and steps may be resorted to without departing from the spirit and the scope of the invention as hereinafter claimed.

What is claimed is:
1. In a dynamoelectric machine having a rotor and having brushes acting on a current collector assembly, the improvement in said current collector assembly comprising,
   a base attached to and rotating with said rotor and having an axis substantially coaxial with the rotor,
   an outer face on said base,
   shoulder means on said base adjacent said outer face and having first and second portions each disposed substantially perpendicular relative to said outer face,
   the surfaces of said outer face and said shoulder portions being insulated,
   a thin metal foil current collector on said insulated outer face,
   anchor means anchoring said foil on said base including portions of the foil at generally opposing places being bent around at least part of said shoulder portions, a plurality of terminal shoulders extending from said outer face toward the edges of said base,
   said metal foil current collectors having extensions covering a substantial portion of said termial shoulders,
   and said anchor means including termial connections of conductors to said metal foil extensions on said terminal shoulders.

2. A current collector assembly as set forth in claim 1 wherein said anchor means includes an adhesive between said metal foil and said outer face.

3. A current collector assembly as set forth in claim 1 wherein said outer face on said ring is transverse to said axis,
   and said portions of said shoulder means are generally parallel to said axis.

4. A current collector assembly as set forth in claim 1 wherein said anchor means includes said shoulder portions being undercut relative to said outer face,
   and said metal foil being bent ninety degrees or more at two shoulder portions for a total bend of more than 180 degrees around said undercut shoulder portions to be clinched onto said base.

5. A current collector assembly as set forth in claim 1 including an annular recess in said outer face substantially coaxial with said axis,
   said anchor means including a washer surrounding said axis and forced into said annular recess and binding a portion of said foil current collector between the walls of said annular recess and said washer.

6. A current collector assembly as set forth in claim 1 including said metal foil being cut through into segments to form a plurality of commutator segments,
   and said anchor means acting at generally opposing places on each commutator segment.

7. A current collector assembly as set forth in claim 6 including said outer face being cut into segments at locations coinciding with the cuts between commutator segments.

8. A current collector assembly as set forth in claim 7 wherein said outer face is substantially perpendicular to said axis,
   said cuts in said foil being substantially radial from said axis,
   and said foil on said portions of said shoulder means being substantially parallel to said axis and generally perpendicular to the foil on said outer face to be clinched on the segments of said outer face.

9. A current collector assembly as set forth in claim 1 wherein said outer face is generally perpendicular to said axis,
said shoulder means first and second portions are on the outer and inner periphery of said outer face, respectively, and said anchor means includes a washer having one of the inner and outer periphery compressing the metal foil against one of said first and second portions of said shoulder means.

10. A current collector assembly as set forth in claim 9, wherein the other of said first and second portions of said shoulder means is undercut relative to said outer face.

11. A current collector assembly as set forth in claim 9, wherein said anchor means includes an insulator washer surrounding said axis,
and the outer periphery thereof compressing the metal foil against said second shoulder means portion.

12. A current collector assembly as set forth in claim 1 including a recess in said outer face substantially perpendicular to said outer face,
and an insulator member forced into said recess and binding a portion of said foil current collector between the walls of said recess and said insulator member.

13. A current collector assembly as set forth in claim 1, wherein said terminal shoulders lie in the same plane as said outer face to facilitate the foil extension covering said outer face and said terminal shoulders.

References Cited
UNITED STATES PATENTS

| | | | |
|---|---|---|---|
| 1,229,149 | 6/1917 | Schwarze | 310—237 |
| 1,536,328 | 5/1925 | Caruso | 310—237 |
| 1,537,692 | 5/1925 | Prouty | 310—237 |
| 2,818,518 | 12/1957 | Phaneuf | 310—237 |
| 2,912,745 | 11/1959 | Steigerwalt | 174—68.5 |
| 2,938,939 | 5/1960 | Malcom | 174—68.5 |
| 2,984,697 | 5/1961 | Bontecue | 174—68.5 |

MILTON O. HIRSCHFIELD, Primary Examiner

ALFRED G. COLLINS, Assistant Examiner